Oct. 3, 1961

F. L. STULEN ET AL 3,002,567

SPAR FOR SUSTAINING ROTORS

Filed Oct. 21, 1953

INVENTORS
FRANK L. STULEN & ROBERT H. STAMM

BY
Jerome A. Gross,
Attorney.

United States Patent Office 3,002,567
Patented Oct. 3, 1961

3,002,567
SPAR FOR SUSTAINING ROTORS
Frank L. Stulen and Robert H. Stamm, Traverse City, Mich., assignors to Parsons Corporation, Detroit, Mich., a corporation of Michigan
Filed Oct. 21, 1953, Ser. No. 387,456
16 Claims. (Cl. 170—159)

This invention relates to blades for rotary winged aircraft, and particularly to steel mass-balances and spars for such blades.

Objects of the present invention include the following:

To develop a steel mass-balance into a rugged brazed tubular rotor spar adapted for easy secure attachment of simple secondary airfoil structure.

To design, arrange, proportion and join the members of such mass-balance spars so soundly as to achieve a probability of survival of at least 10,000 to 1 under operating fatigue loads.

To fabricate such steel mass-balance spars under practical limitations of quantity production; and to achieve this high probability of survival despite normal manufacturing deviations, including variations in material, dimensional tolerances, temperature fluctuation and voids in brazing, effects of decarburizing, residual stresses from fabrication, nicks and scratches.

To provide such a mass-balance spar adapted for easy modification, so that when combined with any suitable aft structure, balance may be achieved in the finally developed blade without need to alter the greater part of the blade structure.

To design a mass-balance spar sufficiently ductile to minimize likelihood of accidental destruction; and sufficiently rigid to be substantially free from local deflections under high working stresses, hence well adapted for adhesive bonding to a secondary blade structure.

To provide such a mass-balance spar in a form having maximum utility, so as to serve the functions of an aerodynamically correct leading edge, a base for ready attachment of the aft structure, and a conduit for fluids or gases.

To teach the use of such mass-balance spar with a simple aft blade structure.

Further objects will appear from the description and claims which follow and from the discussion of the structural principles.

The mass production of full size brazed rotor components necessarily involves deviations from the perfection of small laboratory test specimens. Such deviations affecting strength may include any or all of the following: material irregularities, dimensional variations, temperature fluctuation and voids in brazing, decarburization, residual stresses in fabrication, and such "stress-raisers" as nicks and scratches. If rotor blades are to be mass-produced at a reasonable price, components having such imperfections should be considered as normal.

The problem is to evolve a primary rotor blade structure so basically sound as to insure a high probability of survival for components which includes not one but a number of such manufacturing imperfections. We have found that this result is possible if the design is such that the effects of manufacturing deviations are not cumulative. Conservative allowance may be made for the most serious and endurance-reducing factor to be anticipated (probably residual stresses); but it is not feasible to allow additional margins of safety for each of the other types of anticipated manufacturing deviations.

The structure of the present invention does not require such cumulation of safety factors. Starting with a steel mass-balance, we have developed it into a heavy narrow trough-like steel plate, to form the leading edge of the rotor blade and extend aft only a fraction of the blade chord. Such plate should have sufficient strength of itself to withstand statically the stresses from centrifugal loads and from pure spanwise and chordwise bending. Despite its thickness, such plate will be relatively flexible in torsion. Since its shear center will be forward of the leading edge, cyclic bending moments will result in added torsion, varying increasingly toward the blade root. The principal deflection of a narrow, heavy trough-like plate under such cyclic torsion, as measured at any spanwise station, will be in relative spanwise translation of corresponding points in the upper and lower trough walls.

In the present invention, such relative spanwise translation is resisted in shear through a steel channel having its flanges brazed in broad, even, filleted continuous spanwise seams along the inner surface of the trough plate. the magnitude of these shear loads exerted on the brazed seams will vary spanwise, as will the magnitude of the applied cyclic loads which are resisted in shear in the seams.

Assume the use of such trough plate mass-balance formed as the leading edge of a helicopter rotor blade reinforced spanwise by a steel channel having flanges continuously brazed to the inner upper and lower surfaces of the trough plate over the entire flange width of say .3 inch and bounded forward and aft by fillets separated from each other by this width. If severe vibrations in the trough plate were excited, as by the engine, and resisted by the restraint of the flanges the plate bending moments resulting would increase chordwise aft toward the forward fillets of the wide brazed seams. Stated otherwise, such plate vibrations would cause a chordwise stress gradient across the edges of the spanwise brazed joint. Any cracking into the brazed fillets would impair this restraint and increase the bending moments; this would be likely to cause peeling of the brazed seams. The resistance of a brazed joint to peel is its poorest characteristic. The inception of peeling not only hastens failure of itself, but by spread and by abnormality of deflection, causes fatigue failure at nearby fatigue nuclei, such as nicks and scratches. However, using a trough plate of adequate thickness, and limiting its panel width, as hereinafter stated, will overcome the likelihood of failure from plate vibrations.

The cyclic fatigue loads which result under varying operating conditions from air loads and their reactions, forces operating on the blade masses, and control forces, present a different problem. These are reacted, in the spar described, in bending and torsion. The magnitudes of the internal bending and torsion forces will vary spanwise, and will increase and diminish, and to some extent reverse, one or more times for each revolution of the rotor. Since, in the spar described, both bending and torsion cause shear in the brazed seams, the shear stresses imposed by such cyclic loads will have varying, reversing gradients extending spanwise.

Applied to the assumed blade structure, such stress gradient would arise within the continuous broad brazed seams. Barring local or secondary deflections, we have found that a stress gradient arising within a continuous brazed seam does not have a peeling effect. Fatigue nuclei in the form of surface nicks, material irregularities, etc., remain in effect isolated from each other. Despite such manufacturing deviations, the full predictable blade strength may be achieved with remarkable consistency. Instead of the usual scatter of fatigue test results characterized by a number of failures at unaccountably low loadings, tests of the present structure are so consistent that a mathematical probability of survival of at least 10,000 to 1 may be predicted.

Before further discussion, reference will be made to the drawings illustrating a preferred embodiment of this invention, in which.

Figure 1:
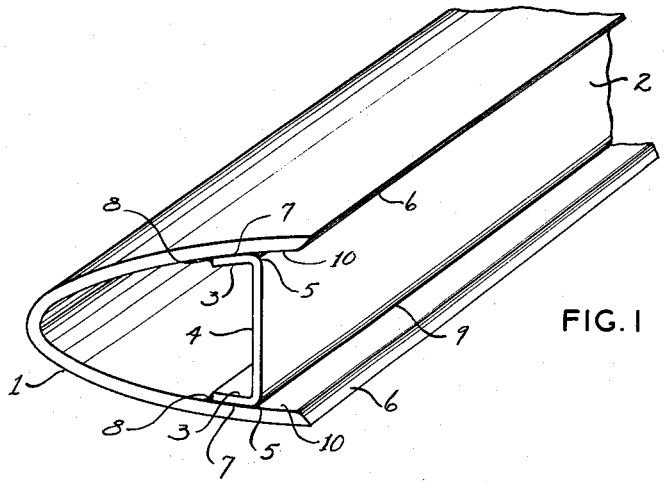
FIGURE 1 is a perspective view of a spanwise fragment of a mass-balance spar embodying the present invention.

The mass-balance spar embodying the present invention comprises a steel trough plate 1 and a steel channel generally designated 2, both preferably formed of strip steel such as SAE 4130 steel in normalized condition, continuously formed by progressive rolling. The channel 2 has forward facing flanges 3 rolled to converge slightly, so that their outer surfaces may be set snugly against the inner surface of the trough-shaped plate 1. The channel 2 further has a substantially vertical web 4 at the aft side of the flanges 3 and upper and lower web-flange radius junctures 5.

The outer surfaces of the flanges 3 are joined to and within the trough plate 1 at and forward of its upper and lower outwardly-coined edges 6, by upper and lower silver brazed seams 7 which are continuous for the entire span of the mass-balance spar. The flow of brazing material results in neat fillets bounding the flanges 3, the forward fillets 8 and the aft fillets 9. After the brazing process has been completed, the seams 7 are inspected visually along their aft fillets 9.

The trough plate 1 has thus been formed into a tubular spar, with several advantages over tubular spars heretofore used for rotor blades. One important advantage relates to the securement of secondary structure.

The portions of the inner surface of the trough plate 1 between the aft fillets 9 and the coined edges (referred to hereafter as the attachment margins 10) may be readily utilized for attachment of an aft blade structure by adhesive bonding, or in any other convenient manner.

The primary structure unit so formed, as illustrated in FIGURE 1, is adapted for retention at its root end to a rotor hub (not shown) in any manner suitable for the particular hub mechanism to be utilized.

Figure 3:
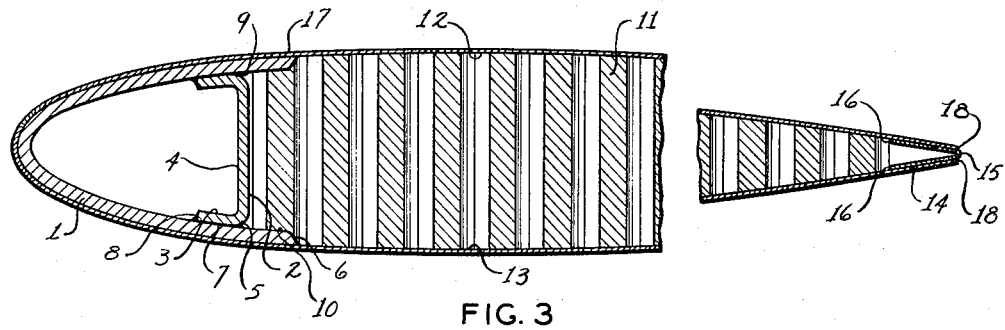
FIGURE 3 is a view of a typical section of the spar of FIGURE 1, together with secondary structure assembled therewith.

Referring to FIGURE 3, there is illustrated in section a simple rotor blade, showing the mass-balance spar of FIGURE 1 with a simple secondary structure or fairing. An aluminum honeycomb filler 11 is bonded adhesively to the aft side of the steel channel web 4 and between the attachment margins 10 of the trough plate 1. Aft of the edges 6, the upper and lower surfaces 12, 13 of the filler 11 are shaped to the contour desired for the aft portion of the rotor blade to be formed. This honeycomb filler 11 extends aft to a trailing edge filler angle 14, an acute angle fabricated of metal with its apex 15 rearward and its long edges 16 abutting chordwise aft of the honeycomb filler 11. A wrap-around stainless steel skin 17 is adhesively bonded securely around the trough plate 1, the honeycomb filler 11 and the trailing edge angle 14, the spanwise edges 18 of the skin 17 lying adjacent to each other at the apex 15 of the trailing edge angle 14.

Figure 2:
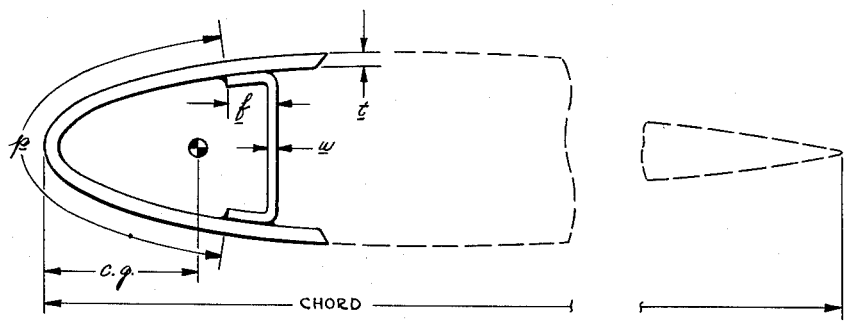
FIGURE 2 is a schematic section of the mass-balance spar shown in FIGURE 1, identifying the dimensions utilized as parameters in the discussion which follows.

We shall now set forth the several structural parameters which make possible mass production of rotor blades embodying the present invention, and realization with reliability of the blade endurance limit without cumulating safety factors for manufacturing deviations. The symbols utilized are explained in FIGURE 2.

(a) *Balance.*—The mass-balance spar serves as the blade primary structure, substantially sufficient of itself to transmit all centrifugal, shear, bending and torsion loads to the blade root. Further, its mass is such as to balance the secondary structure without any substantial leading edge balances. Accordingly, in the present invention the center of gravity of the mass-balance spar itself is located chordwise aft of the leading edge a distance approximately .12 times the blade chord length. Depending upon the lightness of the secondary structure, such spar C.G. may be located aft as far as about .15 times the chord length. This may be expressed as:

$$\text{Mass-balance spar C.G.} < .15 \text{ chord}$$

(b) *Panel stability.*—The stability of the leading edge panel, which extends the entire span of the spar but is limited in width by the brazed seams beneath the upper and lower leading edge surfaces, is related to the thickness of the trough plate. The curvature of the leading edge has a tendency to break the panel width in two, but for present purposes the effect of varying curvatures is disregarded. Accordingly, in FIGURE 2, the effective width of the plate from one brazed seam to the other is designated $p$, and the plate thickness is designated $t$. Satisfactory results have been obtained within the range of sizes expressed by the formula $$.03 > \frac{t}{p} > .01$$

Accordingly, the minimum suitable thickness in a given case may be expressed as:

$$t > .01p$$

At substantially lesser thicknesses, the plate is likely to vibrate excessively in response to externally imposed vibrations.

(c) *Joint adequacy and fillet bending.*—In order that the brazed seams may be effective to limit the width of the trough plate under such vibrations and to withstand them, it is important that the seams be of substantial width. The forward and aft fillets 8, 9 which form the forward and aft margins of the brazed seams 7, tend to grasp the forward edges of the flanges 3 and hold them in shear. The bending moments from any plate vibrations are reacted partly by such fillets 8, 9 as a couple. This mode of reaction lessens the likelihood of fatigue failure in comparison, for example, with a structure having an unflanged stiffener brazed along its edge to a plate, because such joint would itself be subjected to reversing bending stresses.

With the width of the brazed flanges denoted by $f$ and their thickness denoted by $w$, a satisfactory flange width may be determined as follows:

$$f > 5w$$

(d) *Material thicknesses for brazing.*—In order to minimize warpage, it has been necessary to employ plate thicknesses greater than .062 inch. Utilizing the plate as a mass balance makes such plate thickness unobjectionable. Since the location of the channel within the trough plate is less favorable for balance, the minimization of weight dictates the use of a channel of minimum gauge consistent with the requirements of sound brazed joints. The channel thickness has been found satisfactory where:

$$w > .5t$$

The width of the trough plate attachment margins 10 is normally limited to such as may be convenient for the attachment of secondary structure. From the standpoint of mass balance, it is undesirable to continue such attachment margins 10 chordwise aft except for this purpose. No unsatisfactory deflections take place where such attachment margins 10 are as long as 20 percent of the effective panel width $p$, which length is greater than necessary for adhesively bonding an aft fairing such as illustrated in FIGURE 3.

The spanwise continuity of structure of the present invention, and its freedom from applied load concentrations, result in a spar substantially free from local deflections provided the parameters herein set forth are not departed from. This adds reliability to the adhesive bonds by which the secondary blade structure is attached. As is well known, local deflections cause a peeling of adhesively bonded joints; but the rigidity of the present structure renders it free from this danger.

The channel so continuously brazed within the trough plate transforms it into a continuous tubular structure which is substantially integral and well suited for conducting fluids and gases between the blade root and the blade tip. Tubular spar rotor structures have been utilized heretofore, but none fabricated so simply or having such advantageous provision for attachment of secondary structure.

One of the outstanding advantages of the present invention is its suitability for modification after testing. In this respect it is also to be contrasted with previous tubular spar structures. Should either the trough plate or the channel prove to be of improper gauge, it may be modified without extensively changing the other parts of the structure, within the limits of the parameters heretofore set forth. Should any local mass-balancing be required, balance weights may be attached within the curve of the leading edge of the trough plate, or to the forward or aft sides of the web of the channel; and external masses and doublers may be readily added. Hence, where redesign is necessary, it becomes relatively easy and inexpensive.

Another advantage of the present invention is its ductility. Rotor blades are subject to chance contact with various objects, and structural damage to conventional blades has led to failures so sudden as to be almost explosive. In contrast, blades constructed in accordance with the present invention are extremely rugged and surprisingly ductile. Intentional crippling bends have not led to destructive failure. The ductility of the spar thus provides a new element of safety.

The principal merits of the present invention, however, lie in its basically sound structure, which is inherently suited for mass production at low cost and is utterly reliable. Its cost of manufacture is only a fraction of the cost of other rotor blades, yet no blade component has heretofore been constructed to a mathematical probability of survival such as the 10,000 to 1 probability of survival of the present mass balance and spar.

The scope of the present invention should be considered as fully coextensive with the inventive principles herein disclosed.

We claim:

1. A steel spar for sustaining rotor blades, comprising a steel trough plate continuous over substantially the entire span of the blade and constituting its principal structural member, a steel channel arranged spanwise within the trough plate and having flanges including outer surfaces fitting closely against the inner surface of the trough plate, each flange having at its margins a spanwise edge and a spanwise-bend radius portion, and continuous brazed seams joining the entire outer surface areas of the channel flanges to the inner surface of the trough plate whereby to form a continuous spanwise tube, said brazed seams having integral continuous spanwise fillets joining the said spanwise edge and spanwise-bend radius portion of each flange to the inner surface of the trough plate.

2. A spar as defined in claim 1, the said spanwise fillets delimiting the effective width of the trough plate as regards its response to exciting plate vibrations, the thickness of the trough plate being sufficient to raise the frequency at which it responds to vibrations above the frequency of such exciting plate vibrations, thereby avoiding the inception of plate vibratory stresses having gradients across the edges of the brazed spanwise seams.

3. A steel spar as defined in claim 2, the ratio of the thickness of the plate to its effective width as so limited being greater than .01.

4. A steel spar as defined in claim 3, the width of the channel flanges so brazed being greater than five times their thickness.

5. A steel spar as defined in claim 2, having a center of gravity located aft of the blade leading edge not farther than fifteen percent of the length of the blade chord, the ratio of thickness of the plate to its effective width as so limited being greater than .01.

6. A steel and spar as defined in claim 2, the width of the channel flanges so brazed being greater than five times their thickness.

7. A steel spar as defined in claim 1, having a center of gravity located aft of the blade leading edge not farther than fifteen percent of the length of the blade chord.

8. A steel spar as defined in claim 1, the thickness of the trough plate being greater than .062 inch.

9. A steel spar as defined in claim 8, the ratio of the thickness of the plate to its effective width as so limited being greater than .01.

10. A steel spar as defined in claim 8, the thickness of the channel being greater than half the thickness of the trough plate.

11. A steel spar as defined in claim 1, the trough plate having extending margins aft of the channel for attachment of an aft blade fairing.

12. A sustaining rotor blade for rotary wing aircraft, comprising a steel spar as defined in claim 11, together with an aft fairing secured to and between the inner aft margins of the trough plate.

13. A sustaining rotor blade for rotary wing aircraft, comprising a steel spar as defined in claim 1, together with aft fairing structure secured thereto.

14. A sustaining rotor blade as defined in claim 13, the aft fairing having adhesive bonds along its forward edge continuously over substantially the entire span, the load transfer from the aft fairing to the spar being distributed continuously and gradually along the adhesive bond.

15. A sustaining rotor blade as defined in claim 14, together with a metal skin and an adhesive bond securing said skin to the outer surface of the aft fairing and trough plate, the said adhesive bond cooperating in the transfer of load from the aft fairing to the spar continuously along the span.

16. A steel mass-balance and spar for sustaining rotor blades, comprising a steel trough plate continuous over substantially the entire span of the blade and constituting its principal structural member, a steel channel arranged spanwise within the trough plate and having flanges fitting closely against the inner surface thereof, and continuous spanwise brazed seams joining the entire contacting area of the channel flanges to the inner surface of the trough plate whereby to form a continuous spanwise tube, said brazed seams having integral fillets joining the margins of said flanges continuously to the inner surface of the trough plate.

References Cited in the file of this patent

UNITED STATES PATENTS

| | | |
|---|---|---|
| 2,240,310 | McKay | Apr. 29, 1941 |
| 2,460,351 | Hoffman | Feb. 1, 1949 |
| 2,511,858 | Lampton | June 20, 1950 |
| 2,567,124 | Roberts | Sept. 4, 1951 |
| 2,574,980 | Meyers | Nov. 13, 1951 |
| 2,589,193 | Mayne | Mar. 11, 1952 |
| 2,596,818 | Meyers | May 13, 1952 |
| 2,644,537 | Meyers | July 7, 1953 |

FOREIGN PATENTS

| | | |
|---|---|---|
| 625,778 | Great Britain | July 4, 1949 |
| 1,009,798 | France | Mar. 12, 1952 |